United States Patent
Janik et al.

(10) Patent No.: US 9,742,308 B1
(45) Date of Patent: Aug. 22, 2017

(54) PHASE SHIFTED POLYGON FORKED WYE TRANSFORMER

(71) Applicants: John Janik, Houston, TX (US); Mark Bishop, Houston, TX (US)

(72) Inventors: John Janik, Houston, TX (US); Mark Bishop, Houston, TX (US)

(73) Assignee: Electronic Power Design, Inc., Houston, TX (US)

( * ) Notice: Subject to any disclaimer, the term of this patent is extended or adjusted under 35 U.S.C. 154(b) by 0 days.

(21) Appl. No.: 14/701,446

(22) Filed: Apr. 30, 2015

(51) Int. Cl.
*H02M 7/06* (2006.01)
*H01F 30/14* (2006.01)

(52) U.S. Cl.
CPC ............ *H02M 7/068* (2013.01); *H01F 30/14* (2013.01)

(58) Field of Classification Search
CPC ........ H02M 7/068; G01R 25/00; H01F 30/14; H01F 30/12
USPC ................... 363/5, 153, 154, 155; 336/5, 12
See application file for complete search history.

(56) References Cited

U.S. PATENT DOCUMENTS

| | | | | |
|---|---|---|---|---|
| 2,166,900 A | * | 7/1939 | Bohn | .................... H02M 7/153 315/137 |
| 4,876,634 A | * | 10/1989 | Paice | ...................... H02M 7/17 363/126 |
| 2016/0126857 A1 | * | 5/2016 | Paice | ...................... H02M 7/08 363/64 |

* cited by examiner

*Primary Examiner* — Nguyen Tran
(74) *Attorney, Agent, or Firm* — G. Michael Roebuck, PC

(57) ABSTRACT

A pair of phase shifted polygon primary windings, each of which are magnetically coupled to one of a pair of forked wye output windings providing a phase shifted pseudo multiple pulse output voltage waveform from the secondary output windings.

13 Claims, 6 Drawing Sheets

PHASE SHIFTED POLYGON FORKED WYE TRANSFORMER

FIELD OF THE INVENTION

The present invention relates to a phase-shifted polygon forked wye transformer.

BACKGROUND OF THE INVENTION

The invention relates to AC-to-DC converters such as can be used for AC or DC motor drives and computer power supplies. The problem encountered with AC/DC converters is the generation of harmonics to the AC side caused by the rectification process.

SUMMARY OF THE INVENTION

In one particular embodiment of the present invention a redundant pair of phase shifted polygon primary transformers is provided, each of which are magnetically coupled to one of a pair of forked wye output windings providing a pseudo multiple pulse output voltage waveform from the secondary output transformers.

It will be appreciated that the preferred embodiment of a transformer as shown in the FIGS. described in detail below is especially applicable for use as a power distribution unit for supplying computer grade power to data processing equipment, and also for main frame applications.

DETAILED DESCRIPTION OF THE INVENTION

The present invention relates to a poly phase voltage transformer which magnetically shifts harmonic currents caused by non-linear loads present in the input line power distribution network. Harmonic current filtering transformers are well known in the art as disclosed in U.S. Pat. No. 5,434,455 to Kammeter, which is hereby incorporated by reference herein in its entirety. Polygon phase shifting transformers are well known in the art as disclosed in U.S. Pat. No. 4,876,634 to Paice which is hereby incorporated by reference herein in its entirety.

Harmonic currents present in a power distribution network can present significant problems, including power losses, overheating, resonances and over voltages, operational instability, and radio frequency disturbances. Any electronic circuit which presents a non-linear load to the power source will inherently generate harmonic currents. Power thyristors, rectifiers, and "switch mode" power supplies commonly used in data processing and telecommunications equipment are inherently non-linear and are a major cause of power supply degradation due to generation of harmonics.

In a particular embodiment of the present invention, two phase-shifted polygon isolation transformers are provided, each of which are coupled to a forked wye secondary winding to form to polygon-forked wye transformer pairs. The phase of an input 3 phase voltage to the polygon transformers is shifted by each of the polygon-forked wye transformer pairs so that harmonics currents are phase shifted and spread out to mitigate the effects of the harmonic currents. In a particular embodiment, each polygon-forked wye transformer generates a pseudo 12 pulse phased shifted output that is phase shifted away from the other polygon-forked wire transformer pair. In another particular embodiment the two pseudo 12 pulse phase shifted outputs from the two polygon-forked wye transformer pairs are combined to generate a pseudo 24 pulse output. In a particular embodiment, the two polygon-forked wire transformer pairs provide a pseudo 24 pulse output to a redundant power to a load, such as a computer server farm, consisting of multiple computer servers. Thus, in a particular embodiment, the present invention causes the two polygon-forked wye transformer pairs to run cooler, thus allowing more efficient operation by losing less electrical energy through heat. More efficient operation enable designers to use smaller capacity transformers that take up less room than less efficient transformers. In most instances resulting in a cost savings. In the event that one of the redundant polygon-forked wye transformer pairs are taken off line for repair, or due to catastrophic failure, the other remaining polygon-forked wye transformer can be utilized as a 12 pulse power source with phase shifted harmonic currents.

Figures 1, 2:
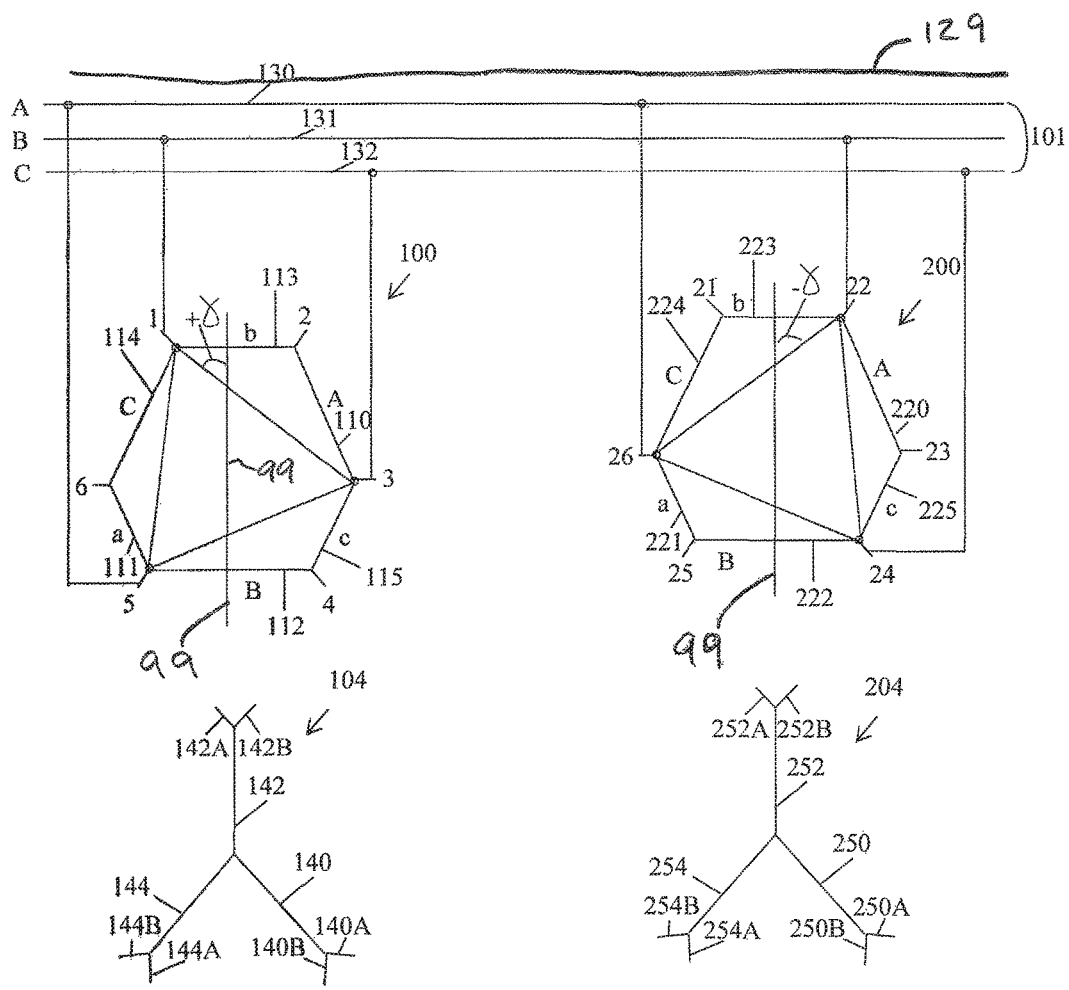
FIG. 1 shows a transformer with a polygon primary connected to a forked wye secondary in a particular embodiment of the present invention.
FIG. 2 shows a transformer with a polygon primary and a forked wye secondary in a particular embodiment of the present invention.

FIG. 1 shows a first polygon primary winding 100 connected to a first wye secondary winding 104. The first polygon primary winding is tapped having a phase shift of plus gamma γ relative to an input voltage to the polygon transformer. A three phase voltage 101 having ground 129 and phases A 130, B 131 and C 132 are connected to the input windings of the polygon transformers 100 and 200. As shown in FIG. 1, phase A of input voltage 101 is connected to polygon transformer 100 at a junction 5 between winding a 111 and winding B 112. Phase B 131 of input voltage 101 is connected to polygon transformer 100 at a junction 1 between winding b 113 and winding C 114. Phase C of input voltage 101 is connected to polygon transformer 100 at a junction 3 between winding A 110 and winding B 115.

FIG. 2 shows a second polygon primary winding 200 connected to a second wye secondary winding 204. The second polygon transformer is tapped having a phase shift of minus gamma relative to an input voltage to the second polygon transformer. A three phase voltage 101 having phases A 130, B 131 and C 132 are connected to the input windings of the polygon transformer 102. As shown in FIG. 1, phase A of input voltage 101 is connected to polygon transformer 102 at a junction 15 between winding a 121 and winding B 122. Phase B of input voltage 101 is connected to polygon transformer 102 at a junction 11 between winding b 123 and winding C 124. Phase C of input voltage 101 is connected to polygon transformer 102 at a junction 13 between winding A 120 and winding B 125.

Figure 3:
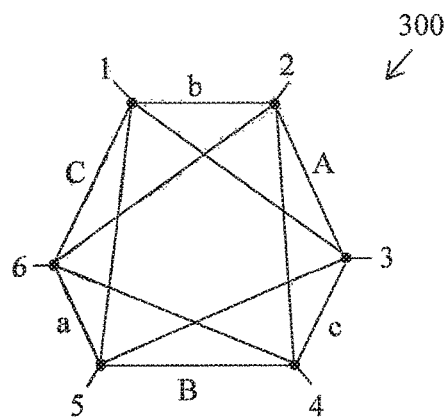
FIG. 3 shows a pair of transformers with polygon primaries and forked wye secondaries in a particular embodiment of the present invention.
Figure 3:
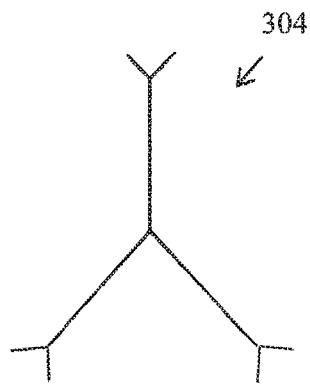
Figure 3:
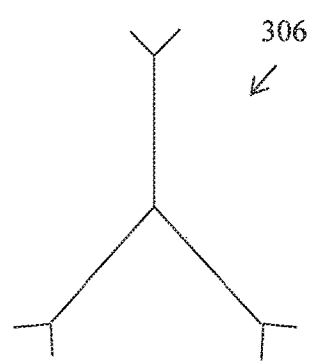
Figure 3:
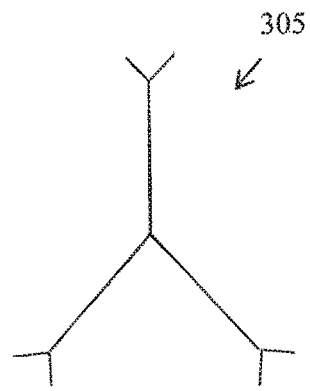
Figure 3:
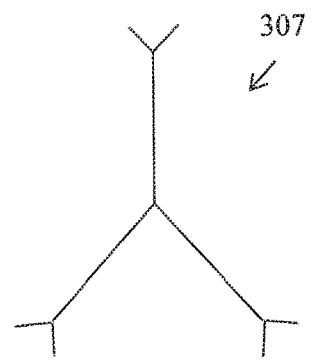

FIG. 3 shows the polygon primary 100 connected to the two wye secondaries 104 and 106, wherein the first wye secondary 104 receives a voltages phase shifted plus gamma relative to the input voltage to the polygon transformer and the second wye secondary 106 receives a voltage phase shifted minus gamma relative to the input voltage to the polygon transformer.

Figure 4:
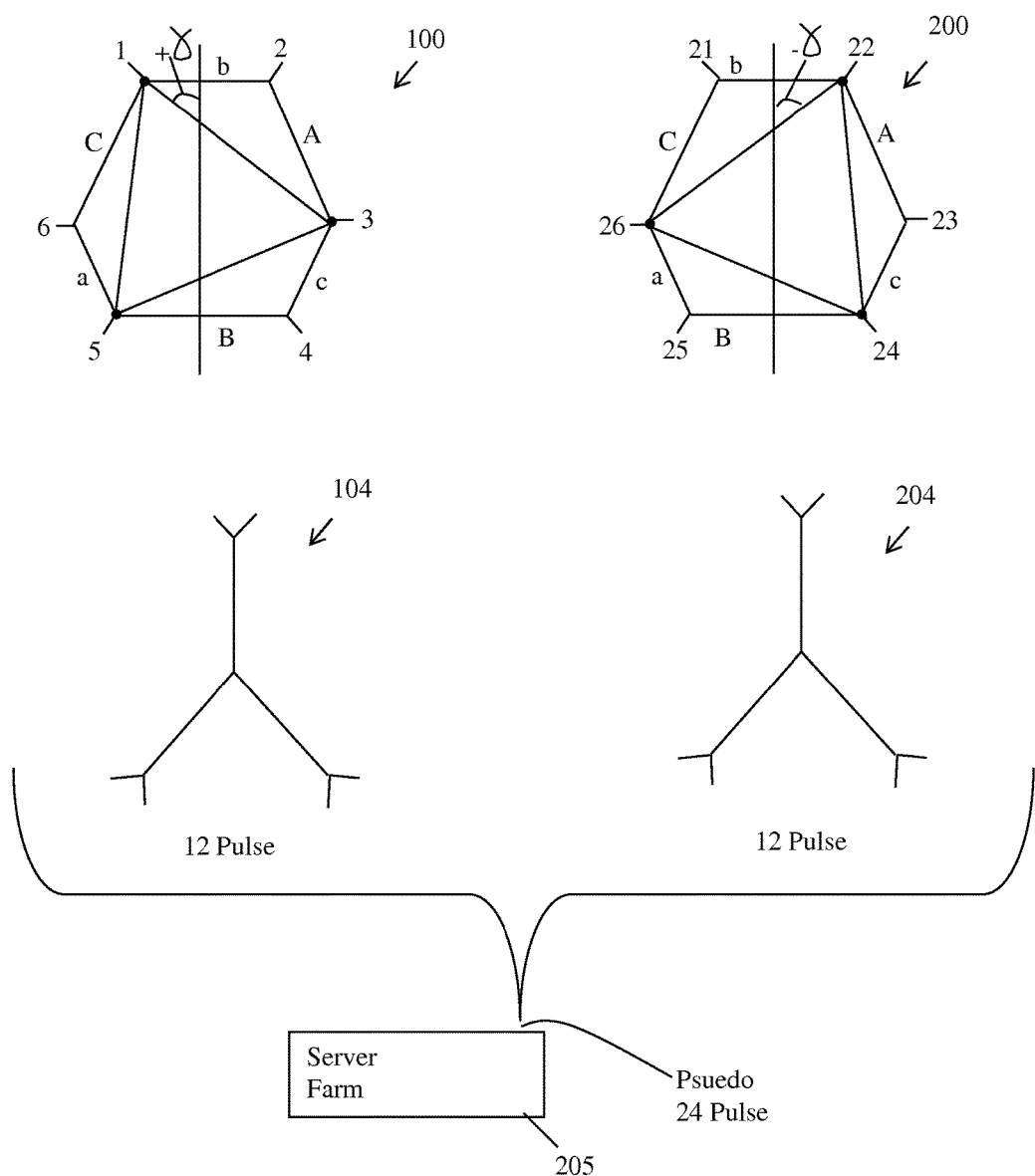
FIG. 4 shows the combined output of two forked wye secondaries connected to a load in a particular embodiment of the present invention.

FIG. 4 shows the combined output of the two wye secondaries 104 and 106 connected to a load, wherein each of the outputs of the two wye secondaries are each producing a pseudo 12 pulse and are combined to form a pseudo 24 pulse output voltage to a load such as a computer server farm 205, wherein the 12 pulse output from the first wye secondary 104 is phase shifted plus gamma γ relative to the input voltage to the polygon transformers 100 and 200 and the 12 pulse output from the first wye secondary 106 is phase shifted minus gamma γ relative to the input voltage 101 to the polygon transformers 100 and 102.

Figures 5, 6:
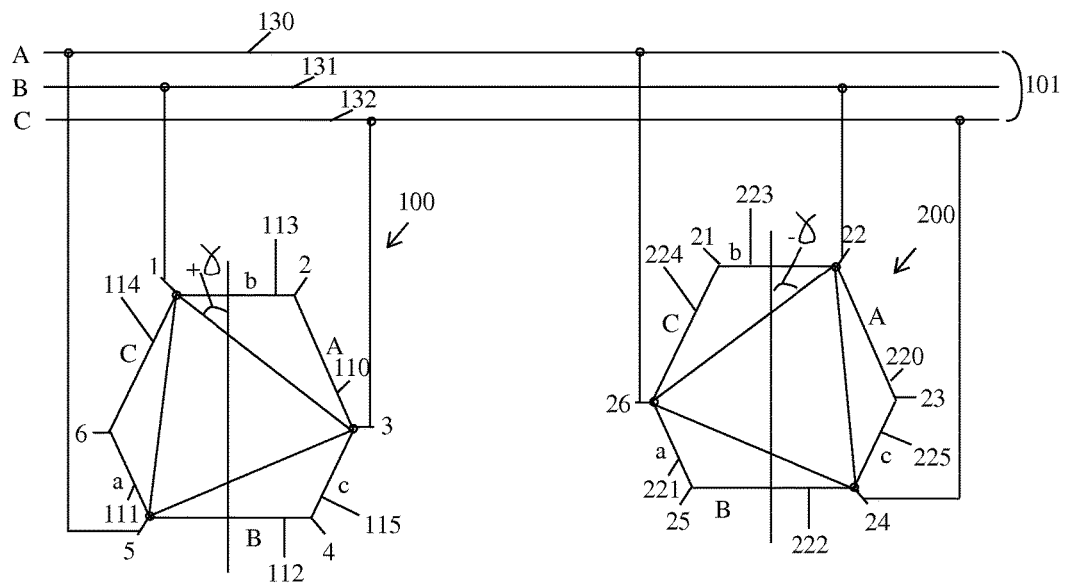
FIG. 5 shows an asymmetric fork 150b' on leg 140 of wye transformer 10.
FIG. 6 shows an asymmetric fork 140b' on leg 150 of wye transformer 106 and asymmetric fork 154b' on leg 154 of wye transformer 106.

FIG. 5 shows an asymmetric fork leg 540B on leg 140 of wye transformer 104. The larger asymmetric fork leg 540B produces a larger phase shifted voltage than the shorter 140A fork leg.

FIG. 6 shows a longer asymmetric fork leg 654B on leg 254 of wye transformer 106 and a longer asymmetric fork leg 650B on leg 250 of wye transformer 106. The asymmetric fork leg 654B produces a larger phase shifted voltage than the shorter 254A fork leg and the asymmetric fork leg 654B produces a larger phase shifted voltage than the shorter 254A fork leg.

As shown in FIG. 1, one set of secondary tappings 1, 3 and 5 is rotated plus ʊ degrees from zero phase shift 99 and being oriented counterclockwise, the other set of secondary tappings 22, 24, 26 being rotated minus ʊ degrees from zero phase shift 99 and being oriented clockwise relative thereto. As shown in FIG. 3 the secondary tappings comprise four three-phase output windings, the four output windings having a relative phase shift of ʊ degrees wherein ʊ degrees is equal to 15°. As shown in FIG. 1 the system is electrically connected to a ground 129. As shown in FIG. 1, a predetermined number of ampere-turns of said one long winding 110 to a point defined on the next long winding 112 by the same said predetermined number of ampere-turns, the predetermined number of ampere-turns being counted from the end of an adjoining short winding 115 preceding counterclockwise, As shown in FIG. 1, the relative phase shift between said output windings is equal to 60 degrees divided by the number of said output windings or in this case 15°.

Figure 7:
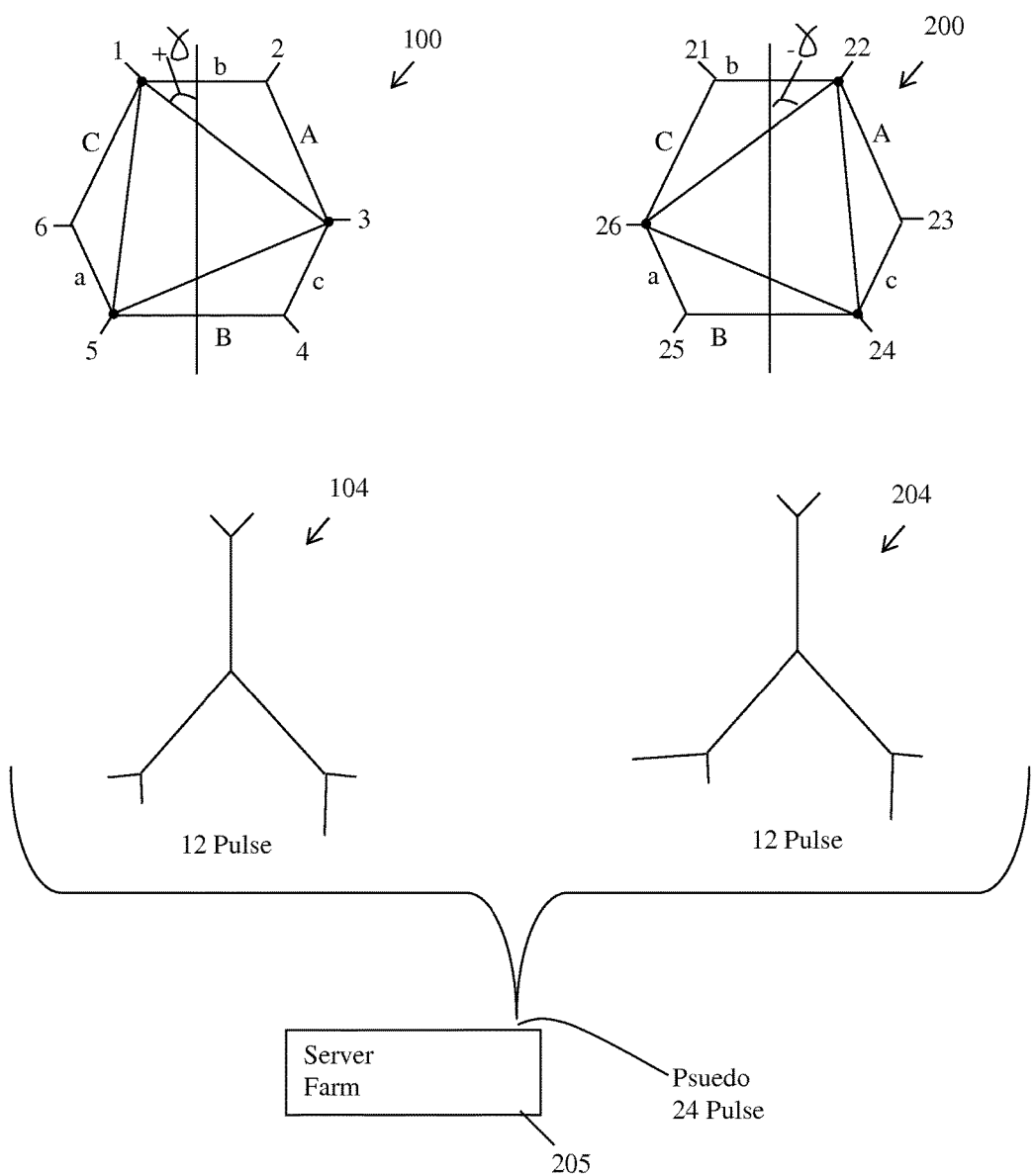
FIG. 7 shows two secondary transformers of FIG. 5 and FIG. 6 combined to form pseudo 24 pulse to a server farm.

FIG. 7 shows two secondary transformers of FIG. 5 and FIG. 6 combined to form phase shifted pseudo 24 pulse to a server farm wherein each prong of the asymmetric forks provide different voltages.

Figure 8:
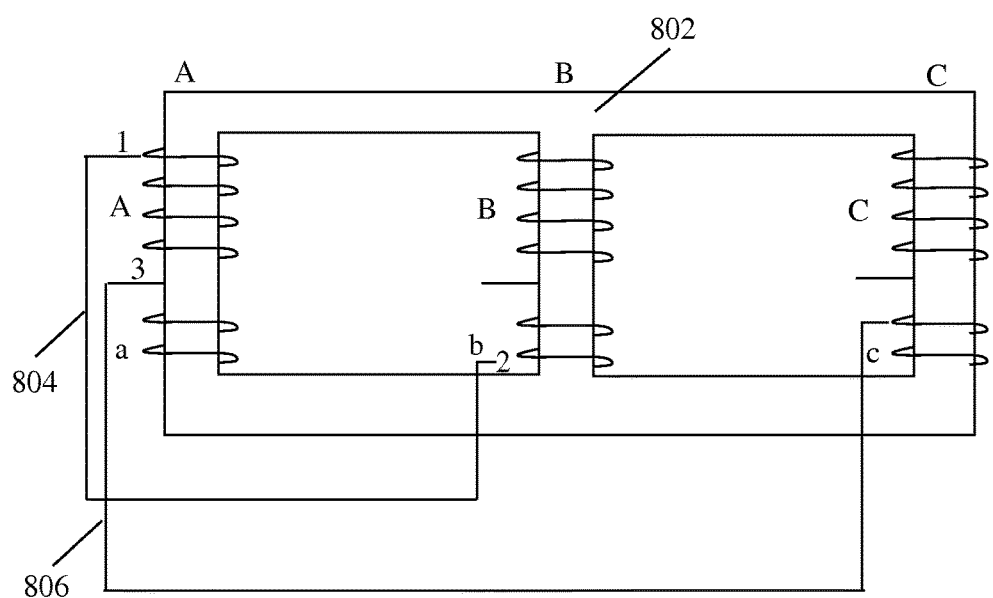
FIG. 8 show a winding arrangement for a particular embodiment.

FIG. 8 show a winding for a particular illustrative embodiment 800. As shown in FIG. 8 the winding of coils A, a, B, b, C and c from FIG. 1 are wound on a core 801.

Having thus described several specifically preferred embodiments of the invention, it will nevertheless be appreciated that numerous other variations are possible. For example, those skilled in the art will appreciate that the invention may easily be adapted to encompass multiple output transformers having more than six or eight three phase wye connected secondary outputs, so long as the outputs are phase shifted to prevent harmonic currents from appearing at the primary winding inputs. This concept may further be adapted to multiple phase transformers other than three-phase transformers and to multiple transformer configurations. The higher the number of secondaries, the higher the number of harmonic orders that can be cancelled.

Thus, it will be appreciated that the phase shifts and number of secondary windings can be varied as desired depending on the number of harmonic pairs and the degree of attenuation required for the harmonic pairs as noted above.

Applications of the system can include, in addition to those noted above, use in fixed and/or mobile power distribution units, fixed and/or mobile harmonic cancellation units, as a load linearizer to isolate nonlinear leads from other equipment, as a power factor correction device, as a KVA conservation device (the power factor correction generally makes the input KVA less than the output KVA, although the input KW is greater than the output KW), as an AC-to-DC convertor for supplying DC loads or to charge batteries and/or capacitors, and as one of a number of redundant or switched redundant units or unit sub-assemblies for high mean time between failures (MTBF) sites or configurations.

Finally, in view of the numerous variations of the invention which are likely to occur to those skilled in the art, it is again noted, as those skilled in the art will understand, that the alcove description is not to be construed as limiting, but rather than the invention be defined solely by the appended claims.

The invention claimed is:
1. An apparatus comprising:
a first polygon connected transformer having at least six windings defining successive tappings there between which constitute secondary tappings of the first transformer;
a second polygon connected transformer having at least six windings defining successive tappings there between which constitute secondary tappings of the second transformer;
a three-phase primary power supply being supplied to the tappings which constitute primary tappings of the first and second transformers, wherein the secondary tappings belong to two sets of three tappings symmetrically disposed about said primary tappings, one set being oriented clockwise, the other set being oriented counterclockwise relative thereto;
and at least two three-phase forked wye-connected output windings inductively coupled with said core, wherein the two three-phase forked wye-connected output windings include an in-phase coil and vector coils for each of said phases, one of said in-phase coils for a first of said phases being connected between a common neutral and two vector coils corresponding respectively to the remaining two phases, the two vector coils being connected to separate output terminals, thereby phase shifting the output windings relative to each other, wherein the one set of secondary tappings forming within the hexagon form a first triangle having each side extending from a point defined on one long winding by a predetermined number of ampere-turns of said one long winding to a point defined on the next long winding by the same said predetermined number of ampere-turns, said points being counted from the end of an adjoining short winding preceding clockwise, with said other set of secondary tappings form a second triangle disposed similarly within the hexagon, said predetermined number of ampere-turns being counted from the end of an adjoining short winding preceding counterclockwise wherein the forked wye transformer has at least one asymmetric form having a longer prong and a shorter prong wherein the longer prong produces a larger voltage than the shorter prong.

2. An apparatus as claimed in claim 1, wherein said output windings comprise two three-phase wye-connected output windings, the two output windings having a relative phase shift of 30°.

3. An apparatus as claimed in claim 1, wherein said output windings comprise four three-phase output windings, the four output windings having a relative phase shift of 15°.

4. The apparatus of claim 1 with the polygon transformer comprising three identical pairs of windings one long and one short symmetrically disposed to form a hexagon of alternatively one short and one long side in succession, with the one set of three secondary tappings forming within said hexagon form the first triangle having each side extending from the end of one short winding to the end of the next short winding following clockwise; and with said other set of three secondary tappings forming the second triangle having a disposition within the hexagon which is similar to the first triangle but relative to a next short winding following counterclockwise.

5. The system of claim 4 with each long winding being coupled magnetically to the short winding of the opposite side of the hexagon, wherein the system is electrically connected to a ground.

6. The system of claim 4 with said long windings being connected in delta between the three primary tappings.

7. The system of claim 4 with each of the short windings having a first and a second secondary tapping, thereby to form a 24-pulse converter system.

8. The system as claimed in claim 1, wherein the output windings comprise two three-phase forked wye-connected output windings, said two output windings having a relative phase shift of 30°.

9. A transformer as claimed in claim 1, wherein said output windings comprise four three-phase output windings, said four output windings having a relative phase shift of 15°.

10. A transformer as claimed in claim 1, wherein said terminals are connected to multiple loads.

11. A transformer as claimed in claim 10, wherein said multiple loads include at least one nonlinear load.

12. A transformer as claimed in claim 1, wherein the relative phase shift between said output windings is equal to 60° divided by the number of said output windings, wherein the number of output windings is 4 and the relative phase shift is 15°.

13. A transformer as claimed in claim 1, wherein said output windings comprise three three-phase output windings, said three output windings having a relative phase shift of 20°.

* * * * *